United States Patent Office 3,544,567
Patented Dec. 1, 1970

3,544,567
PROCESS FOR PRODUCING ARENO-OXAZINONES
Heimo Brunetti, Reinach, Basel-Land, Switzerland, assignor to Geigy Chemical Corporation, Ardsley, N.Y., a corporation of New York
No Drawing. Filed Feb. 16, 1968, Ser. No. 705,934
Claims priority, application Switzerland, Feb. 27, 1967, 2,906/67
Int. Cl. C07d 87/20
U.S. Cl. 260—244                                                                                                   6 Claims

ABSTRACT OF THE DISCLOSURE

Areno-oxazinones are produced from o-hydroxy-arylcarboxylic acids and o-hydroxy-aryl-carboxylic acid amides in the presence of a non-oxidizing inorganic acid halide or organic sulfonic acid halide as condensing agent, at a temperature in the range of from 40 to 230° C., and preferably between 100 and 200° C., optionally with a reaction accelerator and/or an aprotic organic solvent; gaseous products set free during the reaction being continuously eliminated. The resulting areno-oxazinones are valuable intermediates in the production of s-triazine light stabilizers for polymeric synthetic materials.

DETAILED DISCLOSURE

This invention relates to a novel process for producing certain areno-oxazinone compounds, of the formula

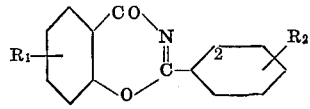

wherein $R_1$ and $R_2$ represent hydrogen or conventional substituents, but $R_2$ represents, in particular, hydroxy in 2-position, are known as valuable intermediate products for the production of s-triazine stabilizers for polymeric synthetic materials due to their absorptivity of certain ranges of ultraviolet light.

These known intermediates were hitherto produced by a two-step process wherein a salicylic acid amide is acylated with an aromatic carboxylic acid chloride in pyridine as basic reaction medium and the corresponding O- or N-acyl salicylic acid amides are obtained, whereupon the latter intermediate acylated amides are converted with ring closure in an acid organic reaction medium, especially xylene or anisol, and introduction of hydrogen chloride to the corresponding benzoxazinone compounds, with conventional purification of the acylated amide intermediates and the benzoxazinone end products.

More in particular, A. Mustafa et al., describe in J.A.C.S. 79, (1957), 3846 the above described process using starting materials which lead to benzoxazinones of the above formula wherein $R_1$ represents hydrogen and $R_2$ represents methyl or methoxy in 4-position, with yield rates of about 61% of benzoxazinone calculated on the starting salicylic acid amide.

In copending patent application Ser. No. 705,928 filed of even date herewith, is described a process for obtaining benzoxazinones and related compounds with the aid of a simplified process and in higher yields than can be obtained by the above-described known methods.

It is an object of this invention to provide a process for the production of the particularly valuable benzoxazinones in which $R_2$ represents a hydroxyl group in 2-position, which requires even fewer production stages then the above-mentioned novel process and even higher yields.

These benzoxazinones are of special value because they are intermediates in the production of the important bis-orthohydroxyphenyl-s-triazine stabilizers for synthetic polymeric materials. The latter compounds are produced from the benzoxazinones obtained by the novel process according to this invention, by methods described in British Pats. 1,011,576 of Mar. 22, 1966 and 1,018,987 of May 23, 1966.

The aforesaid object is attained by the invention which provides a process for the production of areno-oxazinones in a single stage, making the production and isolation of intermediate acid chloride and the use of acid binding agent and hydrogen chloride superfluous; this process according to the invention comprises heating a mixture of (a) a compound of the formula $$HO-A-COOH \qquad (II)$$

wherein A represents the divalent radical of a carbocyclic aromatic ring system having from one to at most three six-membered rings, and —OH and —COOH are in ortho-position relative to each other; and (b) a compound of the formula $$HO-B-CONH_2 \qquad (III)$$

wherein B represents the divalent radical of a carbocyclic aromatic ring system having from one to at most three six-membered rings, and bearing —OH and —COOH in ortho-position relative to each other, which radical B is identical with or different from radical A, and (c) as condensing agent, a non-oxidizing inorganic acid halide or non-oxidizing organic sulfonic acid halide, at a temperature in the range from about 40 to 230° C., and removing continuously from the reaction mixture gaseous products cleaved off during the ensuring reaction, thereby obtaining, when B is identical with A, a compound of the formula

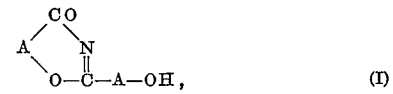

and, when B is different from A, a mixture of the compounds of the formulas

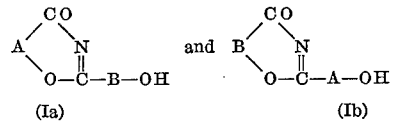

in which formulas the hydroxyl group is in ortho-position to the bond of the respective A or B bearing the same to the oxazinone ring; any other substituents present in any rings of A and B being substituents which remain unchanged under the above reaction conditions.

Preferably the reaction is carried out at about 100° to 200° C.

This process affords products of Formulas I or Ia and Ib of surprisingly great purity and in unexpectedly higher yields.

A and B in Formula I each represent, principally, the radical of a mononuclear ring system, or otherwise the radical of a condensed di- or tri-nuclear ring system. Phenylene and naphthylene radicals are preferred.

As substituents which remain unchanged in the conditions of the process, the radicals A and B can contain, e.g. halogens up to the atomic number 35 such as fluorine, chlorine or bromine, or nitro groups, or optionally substituted alkyl, cycloalkyl or aryl groups, alkylated or acylated hydroxyl or amino groups, esterified carboxyl groups, sulphonic acid ester groups as well as carboxylic or sulphonic acid amide groups optionally substituted at the nitrogen atom.

Alkyl groups as substituents of A and B can be straight or branch chained and have 1 to 18, preferably 1 to 10 carbon atoms. They are, thus, e.g. the methyl, ethyl, isopropyl, tert.octyl or decyl group. The alkyl groups can be substituted by, e.g. aryl groups; examples of such substituted alkyl groups are the benzyl-or or 1-phenylethyl group.

Cycloalkyl groups as substituents of A and B preferably have 7 to 10 carbon atoms. Examples are the cyclohexyl and the methylcyclohexyl group.

Aryl groups as substituents of A and B are, particularly, those of the benzene series having 6 or more carbon atoms such as the phenyl, a methylphenyl, chlorophenyl or methoxyphenyl group.

When A and B contain alkylated hydroxyl or amino groups, then the alkyl radical thereof is an optionally substituted alkyl or alkenyl group. The alkyl groups have 1 to 18, preferably 1 to 12 carbon atoms. Examples of usual substituents of the alkyl groups are halogens such as fluorine, chlorine or bromine, aryl groups, etherified hydroxyl groups, cyano groups and also modified carboxyl groups. By modified carboxyl groups chiefly carboxylic acid ester groups, also however, carboxylic acid amide groups are to be understood; in the latter case, carboxylic acid alkylamide groups, particularly those having a tertiary amide nitrogen atom, are preferred. Examples of further substituted alkyl groups are the 2-chloroethyl, bromoethyl, benzyl, 1-phenylethyl, methylbenzyl, 2-methoxyethyl, 2-ethoxyethyl, 2-cyclohexyloxyethyl, 2-cyanoethyl, carbomethoxymethyl, carboethoxymethyl, carbodecyloxymethyl and the N,N-dimethylcarbamoylmethyl group. Of the alkenyl groups, particularly $\Delta^2$-propenyl groups which can be substituted by low alkyl groups are preferred.

If A and B contain acylated hydroxyl groups, the acyl radical thereof consists of, in particular, a carbonic acid monoester radical having 2 to 11 carbon atoms. Examples are the methoxy-, ethoxy-, butoxy-, decyloxy-, cyclohexyloxy-, benzoyloxy-, phenoxy-, chlorophenoxy- or cresyloxy-carbonyl group.

If A and B contain acylated amino groups, the acyl radical thereof is derived, in particular, from an aliphatic carboxylic acid having 1 to 18, preferably 1 to 10 carbon atoms; the carboxylic acid radical can be substituted, particularly by carbo-low alkoxy or low alkoxy groups. The acyl radical can also be derived from a cycloaliphatic carboxylic acid having 6 to 8 carbon atoms, from an araliphatic carboxylic acid having 8 to 10 carbon atoms or from an aromatic carboxylic acid, in the latter case particularly from a carboxylic acid of the benzene series having 7 to 11 carbon atoms. It can also consist of a carbonic acid monoester radical having 2 to 11 carbon atoms. Examples are the acetyl, propionyl, stearoyl, acryloyl, $\beta$-methoxy-carbonylpropionyl, $\beta$-ethoxy-carbonylpropionyl or $\beta$-hexyloxy-carbonylpropionyl, butoxyacetyl, $\beta$-methoxypropionyl, phenylacetyl, benzoyl, chlorobenzoyl, methylbenzoyl, methoxybenzoyl, butylbenzoyl, methoxycarbonyl, ethoxycarbonyl, butoxycarbonyl, decyloxycarbonyl, cyclohexyloxycarbonyl, benzyloxycarbonyl, phenoxycarbonyl, chlorophenoxycarbonyl or cresyloxycarbonyl group or the radical of crotonic acid, cyclohexane carboxylic acid or cinnamic acid.

Carboxylic acid and sulphonic acid ester groups as substituents of A and B are derived, e.g. from straight chain or branched chain, optionally substituted alkanols or alkenols. The alkanols preferably have 1 to 18 carbon atoms. Examples are methanol, ethanol, isopropanol, pentanol, octanol, decanol or octadecanol. The alkanols can be substituted, e.g. by halogen such as fluorine, chlorine or bromine, aryl groups having 6 or more carbon atoms, alkoxy groups having 1 to 8 carbon atoms or cyano groups. Examples of such substituted alkanols are 2-fluoroethanol, 2-chloroethanol or 2-bromoethanol, 4-chlorobutanol, 2-methoxyethanol, 2-ethoxyethanol or 2-octoxyethanol, benzyl alcohol or 2-phenyl ethanol. Preferred alkenols are those having 3 to 6 carbon atoms such as allyl or methallyl alcohol.

If A and B contain carboxylic or sulphonic acid amide groups then these can be substituted at the nitrogen by the same radicals, which radicals are derived from the alcohols mentioned above.

If the ring systems of the radicals A and B in the starting materials II and III are identical and if the radicals A and B are substituted by the same substituents in the same positions, then in the reaction according to the process of the invention, an end product is obtained having identical Formulae Ia and Ib. If, however, the ring systems A and B in the starting materials II and III are different or the radicals A and B are substituted by different substituents or by the same substituent but in different positions, then in the reaction according to the process of the invention, a mixture of two different end products of Formulae Ia or Ib is obtained, which products can be separated from each other by known operations. However, such a separation is not necessary for the further reaction of the mixture of the end products Ia and Ib to form UV absorbers from the class of o-hydroxyphenyl-s-triazines as both end products of Formulae Ia or Ib yield the same o-hydroxyphenyl-s-triazine in this reaction.

To perform the process according to the invention, about 0.8 to 1.2, preferably 1.1 equivalents of starting compound of Formula II are used for each equivalent of starting compound of Formula III. The amount of acid halide used in the process according to the invention depends on the amount of starting products of Formulae II and III. In general, the best results are obtained when one equivalent of acid halide is used per equivalent of starting material of Formula II and per equivalent of starting material of Formula III.

Non-oxidising inorganic acid halides, preferably acid chlorides are used as acid halides. Examples are the halides of phosphoric acids, particularly those derived from pentavalent phosphorus such as phosphorus pentachloride or phosphorus oxychloride, or carbonic acid halides such as phosgene. Particularly good results are attained on using halides of sulphurous acid, preferably thionyl chloride, as this only forms gaseous side products during the reaction which can easily be removed from the reaction mixture. As acid halides, also organic sulphonic acid halides, preferably the chlorides of aliphatic and aromatic sulphonic acids can be used in the process according to the invention. Examples of such sulphonic acid halides are methane-, ethane-, pentane-, benzene-, p-toluene- p-bromobenzene-, naphthalene-1- or naphthalene-2- sulphonic acid chloride.

For the reaction, the starting materials of Formulae II and III are used, e.g., in a molten form and the acid halide is added dropwise. Better yields are obtained if the starting materials of Formulae II and III are dissolved in a boiling aprotic solvent and the acid chloride is slowly added dropwise. If the acid chloride is solid at room temperature, then it is dissolved in the same aprotic solvent and the solution is added dropwise.

On reacting sensitive components, better results are attained if the starting materials of Formulae II and III are dissolved in an aprotic solvent, the acid chloride is added at room temperature and the mixture is carefully heated to the reaction temperature. Examples of aprotic solvents are optionally substituted, aliphatic, cycloaliphatic or aromatic hydrocarbons as well as higher molecular ethers. Ligroin and heptane are mentioned as aliphatic hydrocarbons and cyclohexane as cycloaliphatic hydrocarbons. The aliphatic hydrocarbons can be substituted by halogen, e.g. carbon tetrachloride, tetrachloroethylene or 1,1,2-trichloroethane. Aromatic solvents which can be used as aprotic solvents are, e.g. benzene, toluene or o-, m- and p-xylene. Also aromatic halogenated hydrocarbons such as chlorobenzene and o-dichlorobenzene, aromatic nitrated hydrocarbons such as nitrobenzene, or aromatic ether hydrocarbons such as anisol can be used. Also aromatic hydrocarbons having different ring substituents such as m-bromotoluene and p-chlorotoluene can be used as aprotic solvents. In addition as aprotic solvents, aliphatic ethers having, preferably, at least 8 carbon atoms can be used such as dibutyl or ethyl hexyl ether. The best results in the process according to the invention are obtained when solvents are used which boil within the range of 100 and 200° C.

Particularly good yields are obtained if from about 0.01 up to 0.2 equivalents of a reaction accelerator are added to the reaction mixture. Particularly tertiary nitrogen bases are used as reaction accelerators, e.g. open chain tertiary amines such as trimethylamine, triethylamine, dimethyl aniline or diethyl aniline; cyclic tertiary amines such as triethylenediamine, N-alkyl-morpholine, N-alkyl-piperidine, N,N-dialkyl-piperazine or quinuclidine; cyclic imines such as pyridine or quinoline; and also tertiary amides of low fatty acids such as dimethyl formamide or dimethyl acetamide. It is often of advantage to add further reaction accelerator during the reaction.

After completion of the reaction the oxazinone of Formula I generally crystallises simply by cooling in a practically pure form. In some cases it is advantageous to remove the solvent in vacuo and to dissolve impurities out of the residue with a strong polar solvent such as diethyl ether, acetone, methylethyl ketone, ethyl acetate, dioxane, tetrahydrofuran, methanol, ethanol, isopropanol, n-butanol, ethylene glycol monomethyl ether, chloroform, glacial acetic acid or dimethyl formamide.

The necessary starting materials of Formulae II and III are produced by generally known methods. Suitable starting materials of Formula II are, e.g. salicylic acid, 4-chloro-, 3,5-dichloro-, 5-methyl-, 5-ethyl-, 3,5-dimethyl-, 4,5-dimethyl-, 5-cyclohexyl-, 5-benzyl-, 5-phenyl-, 4-methoxy-, 4-octoxy-, 4-ethoxycarbonyloxy-, 4-diethyl-amino-, 4-acetylamino-, 4-ethoxycarbonylamino-, 4-methoxycarbonyl-, 4-butoxycarbonyl-, 4-N-N-dimethyl-sulphonamido- salicylic acid, 3-hydroxynaphthalene-2-carboxylic acid, 2-hydroxynaphthalene-1-carboxylic acid or 1-chloro-2-hydroxynaphthalene-3-carboxylic acid.

Suitable starting materials of Formula III are, e.g. salicylamide, 2-hydroxy-5-chloro-, 2-hydroxy-3,5-dimethyl-, 2-hydroxy-3-tert.butyl-, 2-hydroxy - 4 - benzyl-, 2-hydroxy - 5 - cyclohexyl-, 2-hydroxy-5-phenyl-, 2-hydroxy-4-methoxy-, 2-hydroxy - 5 - ethoxy-, 2-hydroxy-4-acetoxy-, 2-hydroxy - 4 - ethoxy-carbonyloxy-, 2-hydroxy-4-dimethylamino-, 2-hydroxy - 4 - benzoylamino-, 2-hydroxy-4-ethoxycarbonyl-, 2-hydroxy - 5 - diethylaminocarbonyl-, 2-hydroxy - 4 - N,N-dimethylsulphonamido- benzamide or 2-hydroxy-3-, 1-hydroxy-2-, 2-hydroxy-1-, 1-chloro-2-hydroxy-3- or 1-hydroxy - 4 - chloro-2 naphthoic acid amide.

The following non-limitative examples illustrate the invention further. The temperatures are given therein in degrees centigrade. Percentages given therein are by weight unless expressly stated otherwise.

It is of particular advantage that not only the purified but also the crude end products of the process according to the invention can be used as intermediates for the production of the afore-mentioned s-triazine stabilizers, in accordance with methods described in the British Pats. 1,011,576 and 1,018,987.

By the term "refluxing mixture" as used in these examples there is meant a liquid mixture which is being heated to the boil under reflux.

EXAMPLE 1

A mixture of 83 g. of salicylic acid, 68.5 g. of salicylic acid amide, 50 ml. of chlorobenzene and 5 ml. of pyridine is heated to reflux temperature whereupon a solution is attained. 131 g. of thionyl chloride are added regularly dropwise within 4 hours to the refluxing solution while stirring vigorously, gaseous hydrochloric acid and sulphur dioxide being given off. Towards the end of the dropwise addition, the 2-(2'-hydroxyphenyl)-4H-1,3-benzoxazinone-(4) begins to separate out in crystalline form. On completion of the dropwise addition, the mixture is stirred for half an hour, the solvent is distilled off under slight vacuum, 200 ml. of methanol are added to the residue, the whole is stirred for some time and then filtered under suction. The pale yellow crystalline product is washed with methanol and then dried. The yield is 103 g. of crude product, M.P. 199–201°. The crude product can be recrystallised from ethylene glycol monomethyl ether; M.P. 204°. (Yield rate of crude product 86% calculated on the amount of salicylic acid amide.)

On repeating this process several times, yields between 100 g. and 106 g. were obtained.

If with otherwise the same procedure, the 50 ml. of chlorobenzene used in the above example are replaced by the amount given of one of the solvents listed in the following table, then the following yields of 2-(2'-hydroxyphenyl)-4H-1,3-benzoxazinone-(4) are obtained.

TABLE

| Solvent | ml. | Yield in g. | Yield rate, percent,[1] |
|---|---|---|---|
| Ligroin | 40 | 86 | 71.5 |
| O-dichlorobenzene | 100 | 88 | 73.5 |
| Dibutyl ether | 250 | 90 | 74 |
| Tetrachloroethylene | 200 | 85 | 71 |

[1] Calculated on the amount of salicylic acid usd.

EXAMPLE 2

A mixture of 20.7 g. of 5-chlorosalicylic acid, 13.7 g. of salicylamide, 20 ml. of chlorobenzene and 1 ml. of pyridine is reacted with 26.2 g. of thionyl chloride as described in Example 1 and the mixture is then worked up. 25 g. of crude product are so obtained which melts at about 180°. As was determined by thin layer chromatographic separation and UV spectroscopic examination, this crude product contains 55% of 2-(2'-hydroxy-5'-chlorophenyl)-4H-1,3-benzoxazinone-(4) and 31% of isomeric 2-(2'-hydroxyphenyl) - 6 - chloro-4H-1,3-benzoxazinone-(4). On recrystallising the crude product first with methylene ketone, then with pyridine and then with ethylene glycol monomethyl ether, pure 2-(2'-hydroxy-5' - chlorophenyl)-4H-1,3-benzoxazinone-(4) is obtained which melts at 234°. (Yield rate of crude product: 91.5%.)

From the crude mixture of benzoxazinones having a melting point of 180° C., 2-(2'-hydroxyphenyl)-4-(2''-hydroxy-5''-chlorophenyl - 6 - decyl-s-triazine is produced by the method described in Example 4 of British Pat. 1,018,987.

EXAMPLE 3

A mixture of 17.15 g. of 5-chloro-salicylamide, 16.5 g. of salicylic acid, 20 ml. of chlorobenzene and 1 ml. of pyridine is reacted with 26.2 g. of thionyl chloride as described in Example 1 and the product is worked up. 24.6 g. of crude product are so obtained. It melts at about 200°. It was determined by thin layer chromatographic separation and UV spectroscopy that this crude product contains 39% of 2-(2'-hydroxy-5-chlorophenyl)-4H-1,3-benzoxazinone-(4) and 40% of isomeric 2-(2'-hydroxyphenyl) - 6 - chloro-4H-1,3-benzoxazinone-(4). Recrystallisation of the crude product from ethylene glycol monomethyl ether, then from glacial acetic acid and then from methylethyl ketone, yields pure 2-(2'-hydroxyphenyl) - 6 - chloro-4H-1,3-benzoxazinone - (4), M.P. 241°. (Yield rate of crude product 90%.)

EXAMPLE 4

A mixture of 91.2 g. of 3-methyl-salicylic acid, 68.5 g. of salicylamide, 5 ml. of pyridine and 45 ml. of chlorobenzene are reacted with 131 g. of thionyl chloride as described in Example 1 and the product is worked up. In this way, 102.5 g. of crude product melting at 145–147° are obtained. It was determined by NMR spectroscopy that this crude product consists of about equal amounts of 2-(2'-hydroxy-3'-methylphenyl) - 4H - 1,3 - benzoxazinone-(4) and isomeric 2-(2'-hydroxyphenyl)-8-methyl- 4H-1,3-benzoxazinone-(4). (Yield rate of crude product 81%.)

If in this example, instead of 3-methyl-salicylic acid, the equivalent amount of 5-methyl-salicylic acid, 3,5-dimethyl-salicylic acid or 4,5-dimethyl-salicylic acid is used and otherwise the procedure given is followed, then instead of the mixture of isomers mentioned above, mixtures of the following isomeric benzoxazinones are obtained (the yield, melting point and solvent used for recrystallisation are given in parenthesis in each case):

2-(2'-hydroxy-5'-methylphenyl)-4H - 1,3 - benzoxazinone-(4) and 2-(2'-hydroxyphenyl)-6-methyl-4H-1,3-benzoxazinone-(4), (100.5 g., 182–184°, acetone); yield rate 79.5%;

2-(2'-hydroxy-3',5'-dimethylphenyl)-4H - 1,3 - benzoxazinone-(4) and 2-(2'-hydroxyphenyl)-6,8-dimethyl-4H-1,3-benzoxazinone-(4), (105 g., 206–208°, methylethyl ketone); yield rate 79%;

2-(2'-hydroxy-4',5'-dimethylphenyl)-4H - 1,3 - benzoxazinone-(4) and 2-(2'-hydroxy-phenyl)-6,7-dimethyl-4H-1,3-benzoxazinone-(4), (103 g., 239–241°, ethanol); yield rate 77.5%.

EXAMPLE 5

A mixture of 36.6 g. of 5-nitro-salicylic acid, 27.4 g. of salicylamide, 150 ml. of chlorobenzene and 2 ml. of pyridine is reacted with 47.6 g. of thionyl chloride as described in Example 1 and then the product is worked up. In this way, 48.2 g. of crude product melting at 257–258° are obtained. It was determined by NMR spectroscopy that this crude product is a mixture of 2-(2'-hydroxy-5'-nitrophenyl)-4H - 1,3 - benzoxazinone-(4) and isomeric 2-(2'-hydroxyphenyl)-6-nitro-4H - 1,3-benzoxazinone-(4). After two recrystallisations from ethylene glycol monomethyl ether, 2-(2'-hydroxyphenyl)-6-nitro-4H-1,3-benzoxazinone-(4) is obtained in a practically pure state. It melts at 259–260°. (Yield rate of crude product 85%.)

EXAMPLE 6

14.7 g. of thionyl chloride are added to a suspension of 13 g. of 4-diethylamino-salicylic acid and 8.2 g. of salicylamide in 150 ml. of chlorobenzene. The mixture is slowly heated while stirring and, at about 45° inner temperature, gas development begins. The temperature is raised to 80° within 30 minutes and this temperature is maintained until gas development is substantially complete. At first almost complete solution is obtained and then the end product finally begins to crystallise out. The inner temperature is slowly raised to 110°, kept there for 5 minutes and then the mixture is allowed to cool. The solvent is removed under vacuum and the residue is stirred with methanol, filtered off under suction, washed with methanol and dried. In this way 13 g. of 2-(2'-hydroxy-4'-diethylaminophenyl)-4H - 1,3 - benzoxazinone - (4) are obtained in the form of yellow crystals in a practically pure state. The substance melts at 175°. On recrystallising the product from methanol, the melting point does not change. The structure of this benzoxazinone was determined by its NMR spectrum. (Yield rate of crude product 70%.)

EXAMPLE 7

A mixture of 113 g. of 2-hydroxy-3-naphthoic acid, 68.5 g. of salicylamide, 5 ml. of pyridine and 250 ml. of chlorobenzene is reacted with 131 g. of thionyl chloride as described in Example 1 and the product is then worked up. In this way 87 g. of a product melting at 200–203° are obtained. It is recrystallised twice from dimethyl formamide and then melts at 228–229°. The two isomers can be obtained as follows from this product which is already sufficiently pure for analysis: The product is first recrystallised from ethylene glycol monomethyl ether (crystallisation A), filtered off under suction and then recrystallised twice from dimethyl formamide, whereupon it melts at 262–263° and, as determined by NMR spectroscopy, it is pure 2-(3'-hydroxynaphthyl-(2'))-4H-1,3-benzoxazinone-(4). The mother liquor obtained in crystallisation A is concentrated and the residue is first boiled out with ligroin and then recrystallised from hexane. In this recrystallisation, first about two thirds of the substance used are allowed to precipitate and this part is filtered off. On cooling the filtrate well, pure 2-(2'-hydroxyphenyl)-4H-1,3-naphtho[3,2-e]oxazinone-(4), M.P. 235–236°, crystallises. Its structure was also confirmed by NMR spectroscopy. (Yield rate of crude product 60%.)

EXAMPLE 8

A mixture of 13.7 g. of salicylamide and 16.6 g. of salicylic acid is heated to 190–200° until a clear melt is obtained. 26.2 g. of thionyl chloride are added dropwise to this melt within 3 hours and the temperature is kept for another 2 hours at 190–200°. After cooling, the solidified reaction mixture is pulverised, mixed with methanol, filtered under suction and dried in vacuo. In this way, 14 g. of 2-(2'-hydroxyhenpyl)-4H-1,3-benzoxazinone-(4), M.P. 198–199°, are obtained. (Yield rate 58.5%.)

EXAMPLE 9

26 g. of thionyl chloride are added dropwise to a refluxing mixture of 16.8 g. of 2-hydroxy-4-methoxy-benzoic acid, 16.7 g. of 2-hydroxy-4-methoxy-benzamide, 1 ml. of dimethyl formamide and 50 ml. of toluene and the whole is boiled until no more gas is developed, which is for about 3 hours. The solvent is removed under water-jet vacuum, the residue is mixed with a mixture of acetone and methanol 1:1 and the crystalline 2-(2'-hydroxy-4'-methoxyphenyl)-7-methoxy-4H - 1,3-benzoxazinone-(4) is filtered off under suction. The yield is 14.5 g. and the melting point, after recrystallisation twice from ethylene glycol monomethyl ether, is 190°. (Yield rate 48.5%.)

EXAMPLE 10

A mixture of 91.5 g. of 2-hydroxy-3-methyl-benzoic acid, 75.5 g. of 2-hydroxy-3-methyl-benzamide, 50 ml. of xylene and 5 ml. of pyridine is reacted with 131 g. of thionyl chloride as described in Example 1 and the product is worked up. In this way 100.3 g. of 2-(2'-hydroxy-3'-methylphenyl) - 8 - methyl-4H-1,3-benzoxazinone-(4), M.P. 205°, are obtained. After recrystallisation from ligroin, the melting point remains unchanged. (Yield rate 75%.)

If in this example instead of 5 ml. of pyridine, the same amount of one of the reaction accelerators given in the following table is used then 2-(2'-hydroxy-3'-methylphenyl)-8-methyl-4H-1,3-benzoxazinone-(4) is obtained in the yields given:

TABLE

| Reaction accelerator | Yield in g. | Yield rate, percent |
|---|---|---|
| Dimethyl aniline | 96 | 72.5 |
| Triethylamine | 98 | 73.5 |
| N-ethyl morpholine | 101 | 76 |
| Triethylenediamine | 92 | 69 |

EXAMPLE 11

A mixture of 30 g. of 2-hydroxy-5-methyl-benzamide, 36 g. of 2-hydroxy-3-methyl-benzoic acid, 50 ml. of chlorobenzene and 2 ml. of quinoline is reacted with 53 g. of thionyl chloride as described in Example 1 and the product is worked up. In this way 40 g. of 2-(2'-hydroxy-5'-methylphenyl) - 6 - methyl-4H-1,3-benzoxazinone-(4), M.P. 215–216°, are obtained. (Yield rate 75%.)

EXAMPLE 12

A mixture of 16.8 g. of 2-hydroxy-4-methoxy-benzoic acid, 13.7 g. of salicylamide and 30 ml. of chlorobenzene is reacted with 24 g. of thionyl chloride as described in Example 1 and the product is worked up. In this way 13.5 g. of a mixture of 2-(2'-hydroxy-4'-methoxyphenyl)-4H-1,3-benzoxazinone-(4) and 2-(2'-hydroxyphenyl)-7-methoxy-4H-1,3-benzoxazinone-(4) is obtained which, after recrystallisation from isopropanol, melts at 135°. (Yield rate 50%.)

If in this example, instead of salicylamide, the equivalent amount of 2-hydroxy-5-methyl- or 2-hydroxy-3,5-dimethyl-benzamide is used with otherwise the same procedure, then 14 g. of a mixture of 2-(2'-hydroxy-4'-methoxyphenyl)-6-methyl-4H-1,3-benzoxazinone-(4) and 2-(2'-hydroxy-5'-methylphenyl) - 7 - methoxy-4H-1,3-benzoxazinone-(4) is obtained, M.P. after recrystallisation from methylethyl ketone, 233–234°, or 16.2 g. of a mixture of 2 - (2'-hydroxy-4'-methoxyphenyl)-6,8-dimethyl-4H - 1,3 - benzoxazinone-(4) and 2-(2'-hydroxy-3',5'-dimethylphenyl)-7-methoxy-4H-1,3-benzoxazinone - (4) is obtained, M.P. after recrystallisation from n-butanol, 220–221°.

EXAMPLE 13

A mixture of 16.7 g. of 2-hydroxy-4-methoxy-benzamide, 20.6 g. of 2-hydroxy-5-chlorobenzoic acid, 1 ml. of dimethyl formamide and 50 ml. of chlorobenzene is reacted with 29 g. of thionyl chloride as described in Example 1 and the product is worked up. In this way 17 g. of a mixture of 2-(2'-hydroxy-5'-chlorophenyl)-7-methoxy-4H-1,3-benzoxazinone-(4) and 2 - (2'-hydroxy-4'-methoxyphenyl)-6-chloro-4H-1,3-benzoxazinone - (4) are obtained. After recrystallisation from methylethyl ketone, the mixture melts at 219–220°. (Yield rate 56%.)

If in this example, instead of 2-hydroxy-4-methoxybenzamide, the equivalent amount of 2-hydroxy-3,5-dimethylbenzamide is used then, with otherwise the same procedure, 21.5 g. of a mixture of 2-(2'-hydroxy-3',5'-dimethylphenyl) - 6 - chloro-4H-1,3-benzoxazinone-(4) and 2-(2'-hydroxy-5'-chlorophenyl)-6,8-dimethyl-4H-1,3-benzoxazinone-(4) are obtained. After recrystallisation from a mixture of benzene and hexane the mixture melts at 240–241°. (Yield rate of crude product 71%.)

EXAMPLE 14

A mixture of 26.5 g. of 2-hydroxy-4-octoxy-benzamide, 29.3 g. of 2-hydroxy-4-octoxy-benzoic acid, 2 ml. of pyridine and 50 ml. of chlorobenzene is reacted as described in Example 1 with 28.3 g. of thionyl chloride and the product is worked up. In this way, 20.2 g. of 2-(2'-hydroxy-4'-octoxyphenyl)-7-octoxy-4H - 1,3-benzoxazinone-(4) are obtained, M.P. after recrystallisation from ethylene glycol monomethyl ether, 122–123°. (Yield rate 42%.)

If in this example, instead of 2-hydroxy-4-octoxybenzoic acid, the equivalent amount of salicylic acid or 2-hydroxy-4-methoxy-benzoic acid is used then, with otherwise the same procedure, 21.9 g. of a mixture of 2-(2'-hydroxyphenyl)-7-octoxy-4H-1,3-benzoxazinone - (4) and 2-(2'-hydroxy-4'-octoxyphenyl)-4H-1,3-benzoxazine - (4) or 22.2 g. of a mixture of 2-(2'-hydroxy-4'-methoxyphenyl)-7-octoxy - 4H-1,3 - benzoxazinone-(4) and 2-(2'-hydroxy-4'-octoxyphenyl) - 7 - methoxy-4H-1,3-benzoxazinone-(4) are obtained. After recrystallisation from ethanol, the former mixture melts at 115–117° and, after recrystallisation from methanol, the latter melts at 103°. (Yield rate of the crude mixtures: 59% and 55%, respectively.)

EXAMPLE 15

43 g. of 2-hydroxy-5-carbomethoxy-benzoic acid, 27.4 g. of salicylamide, 2 ml. of pyridine and 100 ml. of chlorobenzene are reacted with 52.5 g. of thionyl chloride as described in Example 1 and the product is worked up. In this way, 47 g. of a mixture of 2-(2'-hydroxyphenyl)-6-carbomethoxy-4H-1,3-benzoxazinone-(4) and 2-(2'-hydroxy - 5' - carbomethoxyphenyl) - 4H - 1,3-benzoxazinone-(4) are obtained. After recrystallising twice from toluene, the mixture melts at 201°. (Yield rate 79%).

If in this example, instead of 2-hydroxy-5-carbomethoxy-benzoic acid, the equivalent amount of 2-hydroxy-4-N,N-dimethylsulphonamido-benzoic acid is used with otherwise the same procedure, then 50 g. of a mixture of 2-(2' - hydroxyphenyl)-7-N,N-dimethylsulphonamido-4H-1,3-benzoxazinone-(4) and 2-(2'-hydroxy-4'-N,N-dimethylsulphonamidophenyl)-4H-1,3-benzoxazinone - (4) are obtained. After recrystallising twice from chlorobenzene, the mixture melts at 242–243°. (Yield rate 72.5%.)

EXAMPLE 16

95 g. of 2-hydroxy-4-ethoxycarbonyloxy-benzoic acid, 52 g. of salicylamide and 100 ml. of chlorobenzene are reacted with 94 g. of thionyl chloride as described in Example 1 and the product is worked up. In this way, 66.5 g. of a mixture of 2-(2'-hydroxy-4'-ethoxycarbonyloxyphenyl) - 4H - 1,3 - benzoxazinone-(4) and 2-(2'-hydroxyphenyl) - 7 - ethoxycarbonyloxy - 4H - 1,3-benzoxazinone-(4) are obtained, M.P. 185°. (Yield rate 53.5%.)

If in this example, instead of salicylamide, the equivalent amount of 2-hydroxy-4-ethoxycarbonyloxy-benzamide is used with otherwise the same procedure, then 29 g. of 2-(2'-hydroxy-4'-ethoxycarbonyloxyphenyl)-7-ethoxycarbonyloxy - 4H - 1,3-benzoxazinone-(4) are obtained. After recrystallisation from ethylene glycol monomethyl ether, it melts at 159–161°. (Yield rate 17%.)

EXAMPLE 17

23.4 g. of 2-hydroxy-4-acetylamino-benzoic acid, 13.7 g. of salicylamide, 1 ml. of pyridine and 100 ml. of chlorobenzene are reacted with 26.3 g. of thionyl chloride as described in Example 1 and the product is worked up. In this way, 28 g. of a mixture of 2-(2'-hydroxy-4'-acetylaminophenyl)-4H-1,3-benzoxazinone-(4) and 2-(2'-hydroxyphenyl) - 7 - acetylamino-4H-1,3-benzoxazinone-(4) are obtained. After recrystallisation from dimethyl formamide, the mixture melts at 327–328°. (Yield rate of crude product 94%.)

If in this example, instead of 2-hydroxy-4-acetylamino-benzoic acid, the equivalent amount of 2-hydroxy-4-ethoxycarbonylamino-benzoic acid, 2-hydroxy - 4 - cyclohexyl-benzoic acid or 2-hydroxy-5-phenyl-benzoic acid is used with otherwise the same procedure, then mixtures of the following isomeric benzoxazinones are obtained (the yield, melting point and solvent used for recrystallisation are given in each case in parenthesis): 2-2'-hydroxy-4'-ethoxycarbonylaminophenyl) - 4H - 1,3-benoxazinone-(4) and 2-(2'-hydroxyphenyl)-7-ethoxycarbonylamino-4H-1,3-benzoxazinone-(4), (25 g., 226°, chlorobenzene) (yield rate 77%); or 2-(2'-hydroxy-4'-cyclohexylphenyl)-4H-1,3-benzoxazinone-(4) and 2 - (2' - hydroxyphenyl)-7-cyclohexyl - 4H - 1,3-benzoxazinone-(4) (23 g., 251°, chlorobenzene) (yield rate 71.5%); or 2-(2'-hydroxy-5'-phenylphenyl) - 4H - 1,3 - benzoxazinone-(4) and 2 - (2' - hydroxyphenyl)-6-phenyl-4H-1,3-benzoxazinone-(4) (22 g., 216°, n - butanol) (yield rate 70%).

EXAMPLE 18

120 g. of phosgene are introduced within 7 hours into a vigorously refluxing mixture of 68.5 g. of salicylamide, 83 g. of salicylic acid, 5 ml. of pyridine and 100 ml. of chlorobenzene. Air is then bubbled through the cooled reaction mixture for 1 hour, the solvent is removed under water-jet vacuum and the residue is mixed with methanol and filtered under suction. In this way, 50.5 g. of 2-(2'-hydroxyphenyl)-4H-1,3-benzoxazinone-(4) are obtained, M.P. 190–192°. After recrystallisation from glacial acetic acid, the melting point rises to 203°. (Yield rate 42%.)

EXAMPLE 19

A solution of 46 g. of p-toluene sulphonyl chloride in 100 ml. of chlorobenzene is added dropwise within 1 hour under reflux to a mixture of 13.7 g. of salicylamide, 16.5 g. of salicylic acid, 0.5 ml. of pyridine and 20 ml. of chlorobenzene. The mixture is refluxed for 6 hours, the solvent is removed under water-jet vacuum and the residue is mixed with methanol and filtered under suction.

In this way 11.2 g. of 2-(2'-hydroxyphenyl)-4H-1,4-benzoxazinone-(4) are obtained, M.P. 200°. (Yield rate 47%.)

If in this example instead of p-toluene sulphonyl chloride, the equivalent amount of methane sulphonyl chloride is used under otherwise the same conditions, then 15.7 g. of 2-(2'-hydroxyphenyl)-4H-1,3-benzoxazinone-(4) are obtained. (Yield rate 66%.)

EXAMPLE 20

A mixture of 13.7 g. of salicylamide, 16.6 g. of salicylic acid, 1 ml. of pyridine and 50 ml. of chlorobenzene is reacted as described in Example 1 with a solution of 10 g. of phosphorus pentachloride in 70 ml. of chlorobenzene, and the product is worked up. In this way, 9.9 g. of 2-(2'-hydroxyphenyl) - 4H - 1,3 - benzoxazinone-(4) are obtained, M.P. 204°. (Yield rate 41.5%.)

If in this example, instead of phosphorus pentachloride, the equivalent amount of phosphorus oxychloride is used then under otherwise the same conditions, 14 g. of 2-(2'-hydroxyphenyl)-4H-1,3-benzoxazinone-(4) are obtained, M.P. 200–201°. (Yield rate 58.5%.)

I claim:
1. A process for producing areno-oxazinones, comprising heating a mixture of
  (a) a compound of the formula
    HO—A—COOH
  wherein
    A represents the divalent radical of a carbocyclic aromatic ring system having from one to at most three six-membered rings, and —OH and —COOH are in ortho-position relative to each other; and
  (b) a compound of the formula
    HO—B—CONH$_2$
  wherein
    B represents the divalent radical of a carbocyclic aromatic ring system having from one to at most three six-membered rings, and bearing —OH and —COOH in ortho-position relative to each other, which radical B is identical with or different from radical A, and
  (c) as condensing agent, a non-oxidizing inorganic acid halide or non-oxidizing organic sulfonic acid halide, at a temperature in the range from about 40 to 230° C., and removing continuously from the reaction mixture gaseous products cleaved off during the ensuing reaction, thereby obtaining, when B is identical with A, a compound of the formula

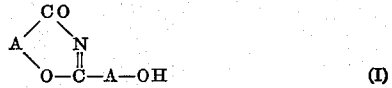

(I)

and, when B is different from A, a mixture of the compounds of the formulas

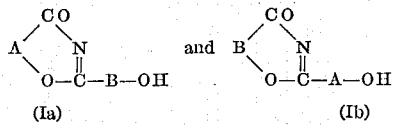

in which formulas the hydroxyl group is in ortho-position to the bond of the respective A or B bearing the same to the oxazinone ring; any other substituents present in any rings of A and B being substituents which remain unchanged under the above reaction conditions.

2. A process as described in claim 1, wherein heating is carried out at a temperature of from 100 to 200° C.

3. A process as described in claim 1, wherein each of A—OH and B—OH in Formulas I, Ia and Ib represents an a-hydroxy-phenyl radical or an o-hydroxy-naphthyl radical any other substituent of which radicals is selected from halogen, nitro, alkyl, cycloalkyl, phenyl, alkoxy, alkylamino, alkoxycarbonyl, alkoxycarbonyloxy, alkanoyloxy, alkanoylamino, carbamoyl, alkyl-substituted carbamoyl, sulfamoyl and alkyl-substituted sulfamoyl; and wherein each of A and B in the oxazinone ring of Formulas I, Ia and Ib represents a phenylene radical or a naphthylene radical any substituent of which is selected from the aforesaid group of substituents.

4. A process as described in claim 1, further comprising adding to the aid mixture prior to or during the heating of the same, per mol of the starting compound defined under (a), about 0.01 to 0.02 mol of a basic tertiary amine or a tertiary amide of a lower fatty acid, as reaction accelerator.

5. A process as described in claim 4, wherein said reaction accelerator is selected from trialkylamine, dialkylaniline, N-alkyl-morpholine, N-alkyl-piperidine, quinuclidine, pyridine, quinoline, dialkylformamide and dialkylacetamide.

6. A process as described in claim 1, wherein said starting compounds defined under (a) and (b) are heated in an aprotic organic solvent.

References Cited

Mustafa et al., J. Am. Chem. Soc. 79, 3846–9 (1957).

HENRY R. JILES, Primary Examiner

G. T. TODD, Assistant Examiner

U.S. Cl. X.R.

260—45.8, 544, 559